United States Patent [19]

McGlasson

[11] Patent Number: 5,482,411

[45] Date of Patent: Jan. 9, 1996

[54] METHOD AND APPARATUS FOR SECURELY CLAMPING A DRILL MOTOR TO A DRILL PLATE

[75] Inventor: John R. McGlasson, St. Charles, Mo.

[73] Assignee: McDonnell Douglas Corporation, St. Louis, Mo.

[21] Appl. No.: 362,113

[22] Filed: Dec. 22, 1994

[51] Int. Cl.$^6$ .............................. B23B 35/00; B23B 45/14
[52] U.S. Cl. .............................. 408/1 R; 408/56; 408/67; 408/97
[58] Field of Search .............................. 408/1 R, 56, 67, 408/72 R, 87, 97, 95, 113, 110

[56] References Cited

U.S. PATENT DOCUMENTS

| | | | |
|---|---|---|---|
| 1,946,584 | 2/1934 | Judge . | |
| 2,839,953 | 6/1958 | Hanger . | |
| 2,909,949 | 10/1959 | Winslow | 408/95 |
| 2,935,905 | 5/1960 | Winslow . | |
| 4,286,902 | 9/1981 | Gagliano et al. | 408/79 |
| 4,396,318 | 8/1983 | Jensen et al. | 408/95 |
| 4,740,117 | 4/1988 | Deleury et al. . | |
| 5,033,917 | 7/1991 | McGlasson et al. . | |
| 5,161,923 | 11/1992 | Reccius . | |
| 5,395,187 | 3/1995 | Ilesinski et al. | 408/72 R |

OTHER PUBLICATIONS

Layout, NDS Jig Collet Foot, 15 QDA–5150 & 5275, Dwg. No. 4525, Dresser Industries, Inc., Nov. 30, 1984.
Nurlock Catalog, p. 242, Telescoping Bushing Tips.

Primary Examiner—Daniel W. Howell
Attorney, Agent, or Firm—Bell, Seltzer, Park & Gibson

[57] ABSTRACT

A device utilizing positive and negative fluid pressure and the plurality of tandem operating components for securely clamping a drill motor to a drill plate in order to drill precisely positioned holes in a workpiece includes an annular mandrel and annular collet concentrically disposed about the cutting tool. A first end of the collet includes a plurality of longitudinally extending fingers while the mandrel has a tapered end portion having a larger external diameter than the center cylindrical portion of the mandrel. A plurality of pistons are also coaxially disposed about the cutting tool and within piston subchambers defined within the piston housing of the clamping device to extend and retract the mandrel and the collet. Once extended, the longitudinally extending fingers of the collet overlie the center cylindrical portion of the mandrel. Thus, the clamping device may be inserted through an aperture defined in a drill plate. Following its retraction, the longitudinally extending fingers of the collet overlie the tapered end of the mandrel and are correspondingly expanded. The expanded fingers engage the aperture defined by the drill plate to securely clamp the drill motor to the drill plate. The device also includes lubricant-coolant delivery and vacuum collection of chip swarf and self-cleaning features.

29 Claims, 4 Drawing Sheets

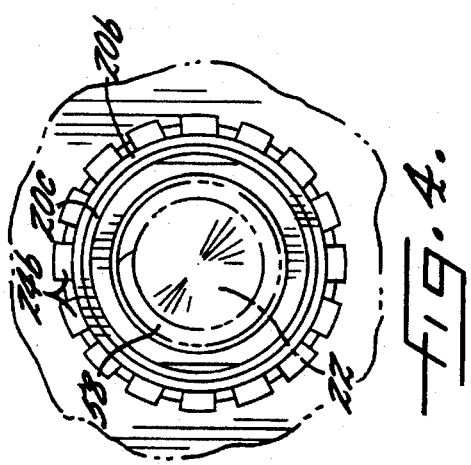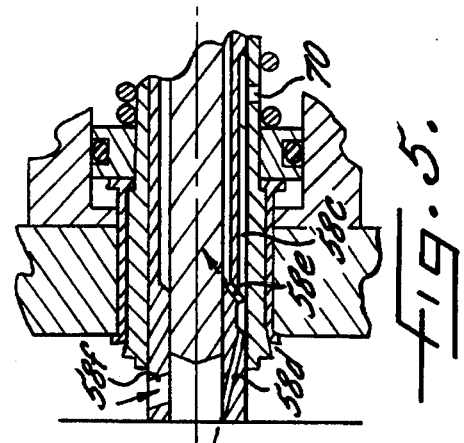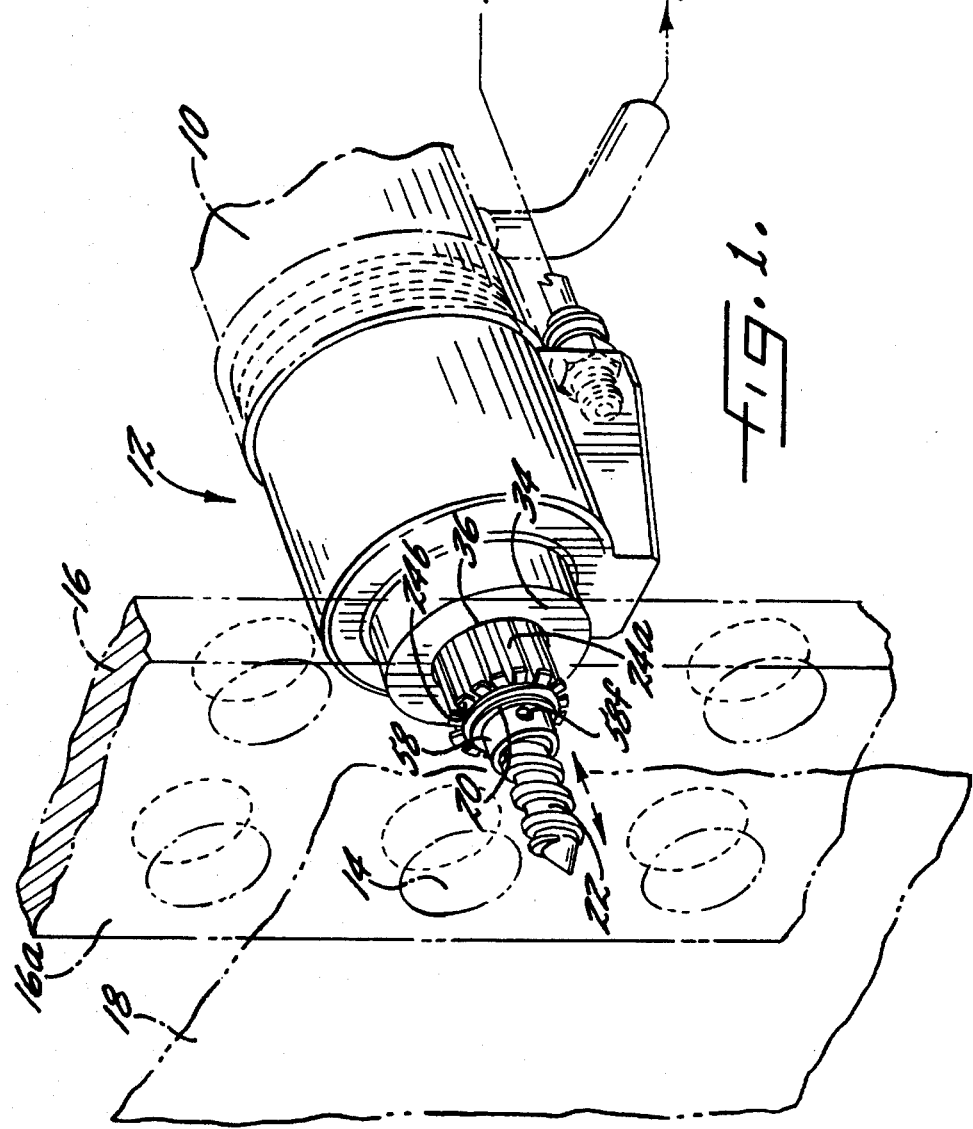

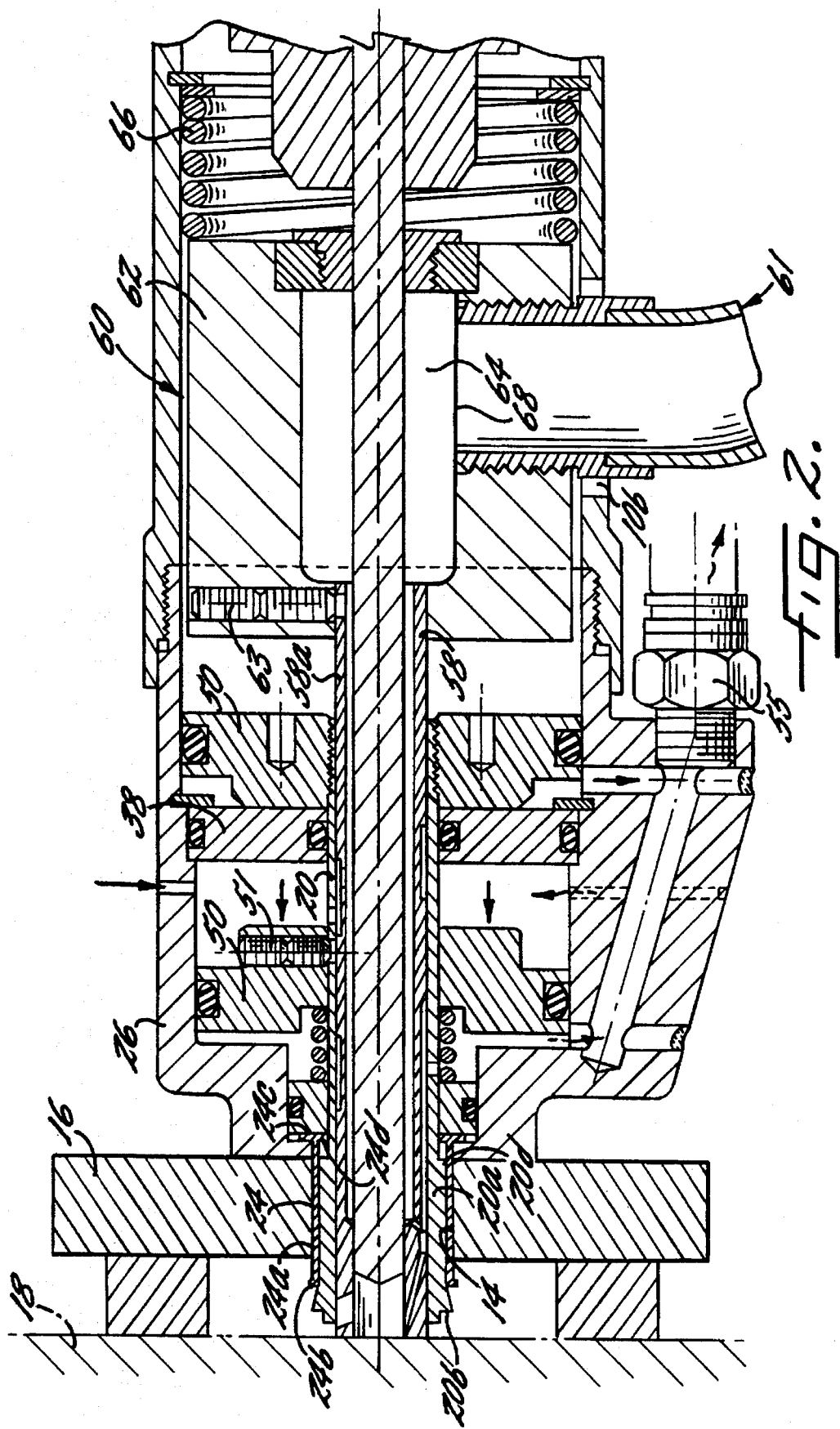

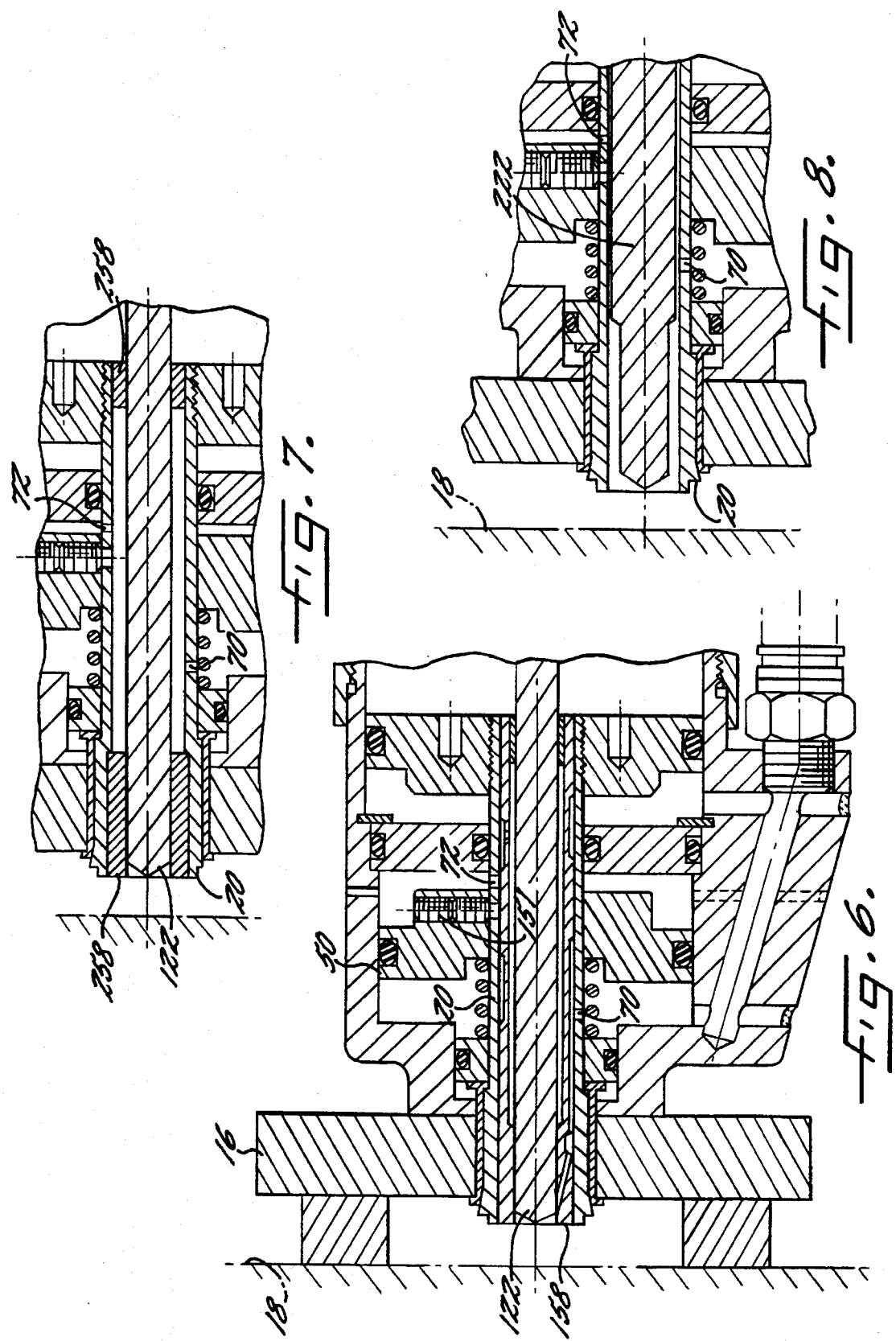

METHOD AND APPARATUS FOR SECURELY CLAMPING A DRILL MOTOR TO A DRILL PLATE

FIELD OF THE INVENTION

The present invention relates to a drill motor clamping device for securing a drill motor to a drill plate and, more particularly, to a clamping device that employs an expandable collet to secure a drill motor to a drill plate.

BACKGROUND OF THE INVENTION

Many applications, such as automotive and aircraft fabrication, require precisely positioned holes to be drilled in a workpiece. The holes must be accurately aligned with only relatively small positioning errors tolerable. Accordingly, a drill plate is typically aligned and mounted in a fixed relation to the workpiece prior to drilling holes in the workpiece. The drill plate has one or more accurately positioned holes extending therethrough such that by properly aligning the drill plate with respect to the workpiece, a hole in the drill plate precisely overlies the desired location for a corresponding hole to be drilled in the workpiece.

In many instances, it is desirable to attach the drill motor to the drill plate such that the operator does not have to offset the full weight of the drill motor and the thrust generated during the drilling operation. Attachment of the drill motor to the drill plate further ensures proper alignment of the cutting tool with the desired hole location in the workpiece. In many instances, the accurately positioned holes must be drilled in relatively hard materials, such as titanium. To drill holes in such materials, it is desirable to use power feed or rack feed drill motors which produce relatively great amounts of axial thrust. Typically, these motors are internally designed so that the drill spindle and cutting tool are actuated with pneumatic and/or hydraulic power or with the assistance of a rack and pinion drive. Since these motors are generally heavy and produce a relatively great amount of thrust, however, the drill motor is generally firmly clamped to a drill plate and the drill plate is, in turn, firmly clamped to the workpiece. Accordingly, the affixation of a drill motor to a drill plate eliminates the need for the drill motor operator to apply axial pressure during the drilling operation.

Power feed drill motors are commonly attached to a drill plate by means of lock screws, lock buttons or specially designed liner bushings. For example, a pair of lock screws may be positioned on opposite sides of an aperture defined in the drill plate. Lock screws typically have an unthreaded portion underlying the slotted head for receiving a corresponding flange of a locking drill bushing that is mounted to the nose housing of a drill motor. Accordingly, the locking drill bushing of the drill motor is inserted into an aperture defined in a drill plate and rotated so that the flange of the locking drill bushing is engaged and retained beneath the slotted head of the lock screws. The drill motor is thus affixed to the front surface of the drill plate.

The use of lock screws, lock buttons or specially designed liner bushings in the drill plate typically increases both the cost of drill plates and the labor cost associated with using these drill plates. In particular, the expense of the lock screws, lock buttons and liner bushings as well as the labor costs for installation and maintenance increase the cost of the drill plates. In addition, lock screws, lock buttons, and liner bushings increase the size and weight of drill plates and preclude the close spacing or overlapping of apertures in the drill plate. Thus, additional or multiple drill plates may be required for a single part.

In order to securely clamp a drill motor to a drill plate without the use of lock screws, specially adapted sleeves and bushings have been designed for incorporation into the drill plate. Examples of such sleeves and bushings incorporated in drill plates include those described in U.S. Pat. No. 5,161,923 (the '923 patent) to Helmut Reccius on Nov. 10, 1992 and U.S. Pat. No. 4,740,117 (the '117 patent) to Marie-José Schaff Deleury et al. on Apr. 26, 1988. The drill plate described in the '923 patent includes a cylindrical protrusion extending outwardly from the front face of the drill plate and a recessed periphery about the aperture on the rear face of the drill plate to align and support the drill motor. The machine tool of the '923 patent includes a nosepiece having a number of longitudinal tongues. The tongues are adapted to expand within the aperture of the drill plate and be received within the recessed periphery of the aperture.

Further, the '117 patent discloses drill bushing inserts or sleeves within apertures defined in the drill plate. The inserts have a cylindrical portion extending outwardly from the front face of the drill plate about each aperture. The cylindrical portion has a flanged end for mating with the correspondingly designed drill motor. In particular, the drill motor has a plurality of protruding fingers having a flanged end portion adapted to mate with the flanged end of the cylindrical portion.

In addition, U.S. Pat. No. 2,839,953 (the '953 patent) to Randolph T. Hanger on Jun. 24, 1958 also incorporates a sleeve within the aperture defined in the drill plate. The drill bushing of the '953 patent is manually expanded within the tapered sleeve to attach the drill motor to the drill plate.

The fabrication of specially designed drill plates, however, increases the cost of the drill plates and the time required for their manufacture. The use of sleeves or bushings within the apertures of a drill plate also prevents the incorporation of overlapping apertures in the drill plate. In addition, such specially designed drill plates may generally only be used with drill motors having bushings designed to mate with the corresponding sleeves or bushings of the drill plate.

Drill bushings have also been specially designed for attachment to drill motors in order to clamp the drill motor to a drill plate. For example, U.S. Pat. No. 2,935,905 (the '905 patent) to J. C. Winslow on May 10, 1960 discloses a drill bushing adapted for extension through an aperture in a drill plate and for attachment thereto. The drill bushing of the '905 patent incorporates a pneumatically-actuated ram assembly for extending the drill bushing through tile aperture in the drill plate.

The ram assembly of the '905 patent, however, is offset from the cutting tool and is an integral component of the drill motor itself. This configuration generally requires dedicated motors for specific drill applications which are generally relatively expensive. The offset ram assembly can also tend to bind, when activated, which may compromise proper alignment of the cutting tool and the production of quality holes in the workpiece. The offset configuration also requires additional space which may limit lateral movement of the drill motor and prevent access to all apertures in the drill plate.

Thus, while it would be desirable to securely clamp a drill motor to a drill plate in order to drill precisely aligned holes, such clamping of a drill motor to a drill plate still suffers from a number of deficiencies. These deficiencies include, for example, the need for specially designed bushings or sleeves in the drill plate, the use of expensive dedicated drill motors with offset integral ram assemblies, and the inability to reach areas of limited lateral access. These deficiencies are particularly apparent in instances which require relatively large clamping forces including instances in which a drill motor must produce relatively large amounts of thrust such as, for example, drilling holes in relatively hard materials with power feed drill motors.

SUMMARY OF THE INVENTION

It is therefore an object of the invention to provide an improved method and apparatus for clamping a drill motor to a drill plate.

It is another object of the invention to provide an improved method and apparatus for clamping a drill motor to a relatively inexpensive drill plate which does not include costly locking components.

It is a further object of the invention to provide an improved method and apparatus for increasing the clamping force with which a drill motor is clamped to a drill plate.

These and other objects are provided, according to the invention, by a clamping device including a piston housing defining a piston chamber in which a plurality of annular pistons are disposed and through which a concentrically disposed annular mandrel and annular collet, having a plurality of longitudinally extending fingers, extend such that upon forward movement of the annular pistons within the piston housing the mandrel and the collet are extended through an aperture defined in a drill plate and upon rearward movement of the annular pistons within the piston housing the mandrel and the collet are retracted such that the longitudinally extending fingers of the collet expand radially. An associated drill motor can thus be securely clamped to the drill plate.

The piston housing, having first and second opposed open ends, defines the piston chamber which is, in turn, divided into a plurality of piston subchambers by a plurality of annular spacers disposed within the piston housing. Each of the annular pistons is mounted to the mandrel and is disposed in one of the piston subchambers. Thus, each piston subchamber is further defined into a forward portion and a rearward portion by the annular piston. Further, each annular piston defines a bore having a longitudinal axis extending coaxially with the longitudinal axis of the mandrel and the collet.

The lengthwise extending annular mandrel extends through the first open end of the piston housing and defines a cylindrical internal bore through which a cutting tool can extend. The mandrel has a shaft portion having a first external diameter and a tapered end portion having a second external diameter greater than the first external diameter. In one embodiment, the mandrel also has a cylindrical end portion adjacent to and extending beyond the tapered end portion to further support the cutting tool.

The clamping device also includes extension means for urging the plurality of annular pistons forward within the piston housing toward the first open end such that the mandrel and the collet are longitudinally moved from a retracted position to an extended position. In the extended position, the mandrel extends beyond the collet and the plurality of longitudinally extending fingers of the collet overlie the shaft portion of the mandrel. Thus, the mandrel and the collet may be inserted through an aperture defined in the drill plate.

The clamping device also includes retraction means for urging the plurality of annular pistons rearward within the piston housing toward the second open end such that the mandrel is moved within the collet from the extended position to the retracted position. In the retracted position, the longitudinally extending fingers of the collet overlie a tapered end portion of the mandrel and correspondingly expand radially. Thus, the clamping device and, in particular, the longitudinally extending fingers of the collet engage the drill plate and securely clamp the drill motor to the drill plate.

In one embodiment, the piston housing defines a plurality of ports extending therethrough into a piston subchamber. In this embodiment, the extension means preferably includes means for introducing fluid through at least one of the plurality of ports in the piston housing into a rearward portion of piston subchamber such that each piston is urged forward thereby. The extension means also preferably includes means for evacuating fluid from a forward portion of at least one piston subchamber through at least one of the plurality of ports to further urge each piston forward within a piston subchamber.

In this embodiment, the retraction means also preferably includes means for evacuating fluid from the rearward portion of at least one piston subchamber through at least one of the plurality of ports of the piston housing to urge each piston rearward within a piston subchamber. The retraction means of this embodiment also preferably includes means for introducing fluid through at least one of the plurality of ports into a forward portion of at least one piston subchamber such that each piston is urged rearward within a piston subchamber.

The first open end of the piston housing preferably includes a from face defining an aperture therein. A rear portion of the collet extends through the aperture defined in the front face of the piston housing. The rear portion of the collet has a radially outwardly extending flange that is retained within the piston housing. The clamping device also preferably includes a collet piston disposed in the piston housing adjacent the annular collet. In this embodiment, the retraction means includes means for introducing fluid into the forwardmost piston subchamber such that the collet piston is urged forward to thereby provide a resistant force for collet expansion and relative movement between the mandrel and the collet during retraction. The clamping device of this embodiment also preferably includes a collet spring disposed within the piston housing. The collet spring has a first end adjacent an annular piston and the second end adjacent the collet piston such that the collet is also urged forward by the collet spring.

One embodiment of the clamping device of the present invention includes a lubricant-coolant supply port defined in the mandrel. This embodiment of the clamping device also preferably includes means for introducing lubricant-coolant through the coolant supply port for delivery to the cutting tool into the workpiece. The lubricant-coolant serves to cool and lubricate the workpiece and the cutting tool as well as to expel chip swarf generated by the drilling operation.

The clamping device also preferably includes an annular drill guide concentrically disposed within the mandrel and the collet for further supporting the cutting tool. In the embodiment employing lubricant-coolant introducing means, the drill guide preferably defines a longitudinal channel along an exterior surface and at least one aperture extending through the drill guide from the longitudinal channel through which the lubricant-coolant introduced through the lubricant-coolant supply port flows prior to delivery to the cutting tool and the workpiece.

Another embodiment of the clamping device incorporates vacuum capabilities and includes a vacuum port defined in the piston housing. The clamping device of this embodiment also includes means, in communication with the vacuum port, for vacuuming expended coolant and chip swarf from the cylindrical internal bore of the mandrel.

In operation, the combination of the drill motor and the clamping device is aligned with an aperture defined through a drill plate. The mandrel and collet are extended and inserted through the aperture as the clamping device is moved from the retracted position to the extended position. Once inserted through the aperture, the mandrel and the collet are simultaneously retracted from the extended position to the retracted position such that the longitudinally extending fingers of the collet are expanded. In one embodiment, the longitudinally extending fingers of the collet expand within the aperture defined in the drill plate to securely clamp the drill motor to the drill plate. In another embodiment, the longitudinally extending fingers include an outwardly extending flange which hooks behind the drill plate and securely clamps the drill motor to the drill plate.

To remove the drill motor from the drill plate, the steps are reversed. For example, the mandrel and the collet are extended from the retracted position to the extended position by advancing the plurality of pistons forward in the piston chamber. Thereafter, the clamping device may be removed from the aperture defined in the drill plate since the longitudinally extending fingers of the collet once again overlie the shaft portion of the mandrel and, accordingly, are no longer expanded.

The method and apparatus for securely clamping a drill motor to a drill plate according to this invention allows a clamping device to be inserted through an aperture in a drill plate such that the drill motor in combination with the clamping device may be securely clamped to a drill plate which has no internal sleeves or bushings and includes no lock screws. Thus, the clamping device of the present invention may securely clamp a drill motor to overlapping or closely positioned apertures formed in the drill plate to drill closely positioned holes. In addition, the flush abutment of the front face of the piston housing with the drill plate further secures the drill motor to the drill plate.

The coaxial alignment of the plurality of pistons within the piston housing about the cutting tool also allows the clamping device to efficiently extend and retract the mandrel and the collet by placing direct axial forces on the mandrel and the collet without cantilevering the drill motor or the drill bushing. Still further, the use of a plurality of pistons, each disposed in a piston subchamber, significantly increases the clampup force provided by the clamping device and provides improved resistance to the thrust of the cutting tool as it is being power fed into the workpiece and, in particular, into relatively hard workpiece materials.

BRIEF DESCRIPTION OF THE DRAWINGS

FIG. 1 is a perspective view of a drill motor and a clamping nose adapter according to the present invention.

FIG. 2 is a lateral cross-sectional view of a clamping nose adapter of the present invention having vacuum capabilities in an extended position.

FIG. 4 is an end view of a clamping nose adapter according to the present invention in the retracted position and clamped to a drill plate.

FIG. 5 is a fragmentary lateral cross-sectional view of a portion of a clamping nose adapter of the present invention illustrating the direction of fluid flow for lubricating and cooling the cutting tool as well as for providing a fluid stream to facilitate chip swarf removal.

FIG. 6 is a lateral cross-sectional view of a clamping nose adapter of the present invention which does not have vacuum capabilities and which is in a retracted position.

FIG. 7 is a fragmentary lateral cross-sectional view of a clamping nose adapter of the present invention in the retracted position which includes a pressed-in drill guide and which does not have vacuum capabilities.

FIG. 8 is a fragmentary lateral cross-sectional view of a clamping nose adapter of the present invention illustrating the use of a cutting tool without a drill guide and without vacuum capabilities in the retracted position.

DESCRIPTION OF THE PREFERRED EMBODIMENT

Figure 3:
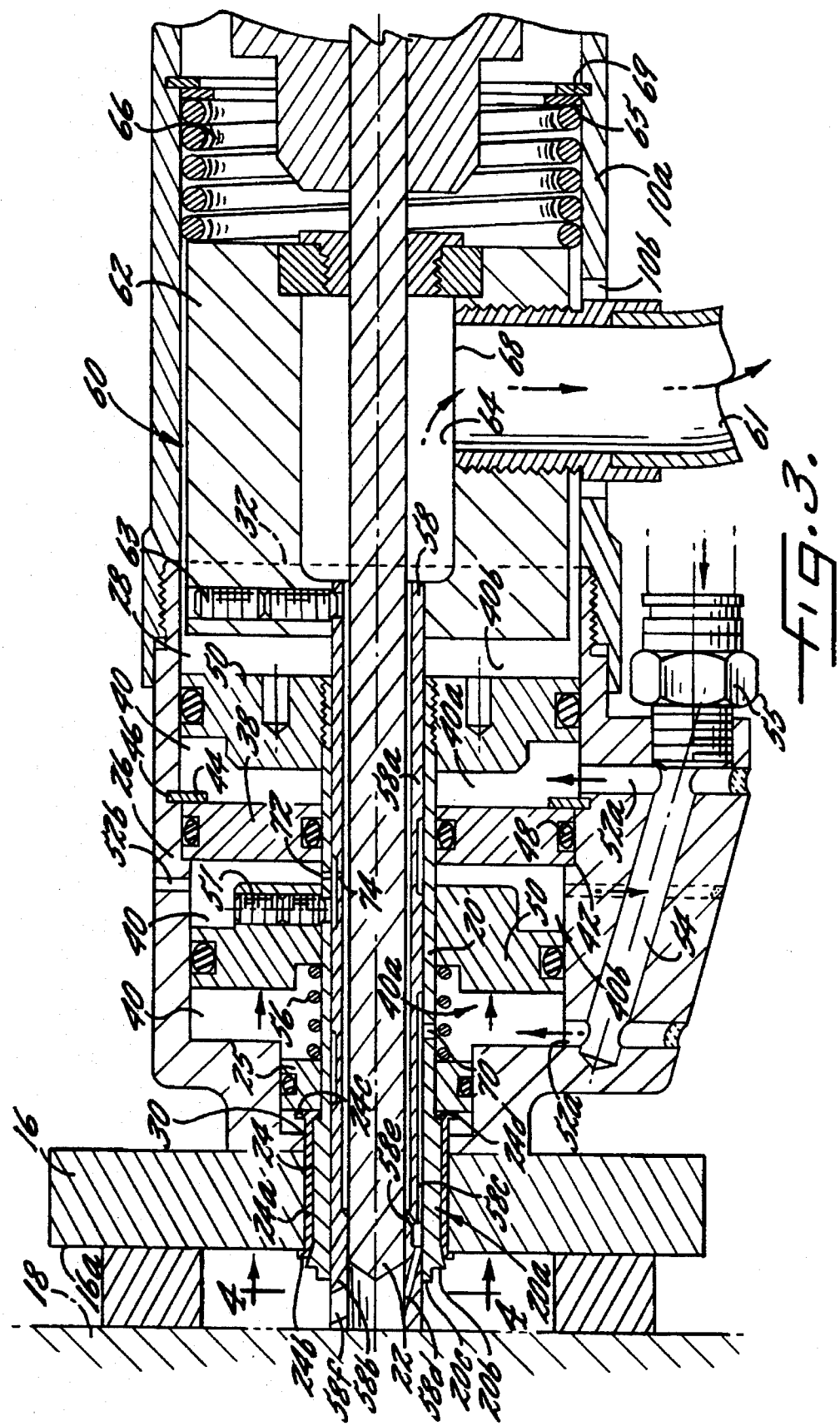
FIG. 3 is a lateral cross-sectional view of a clamping nose adapter according to the present invention having vacuum capabilities in a retracted position.

The present invention now will be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers referred a like element throughout.

As illustrated in FIG. 1, a drill motor 10 and a clamping device or clamping nose adapter according to the present invention are illustrated. Although any means of attaching the clamping nose adapter 12 to the drill motor 10 known to those skilled in the art can be employed, the rear portion of the clamping nose adapter 12 can be connected to the drill motor 10 by complementary threads on the clamping nose adapter 12 and the drill motor 10.

The clamping nose adapter 12 is adapted to be inserted through and expanded within an aperture 14 defined in a drill plate 16 to securely clamp the drill motor 10 to the drill plate 16. The drill plate 16 is preferably spaced apart from the workpiece 18 to facilitate the extraction of chip swarf and expended lubricant-coolant by embodiments of the drill motor 10 and clamping nose adapter 12 which include vacuum capabilities as described hereinbelow. Once the drill motor 10 has been clamped to the drill plate 16, a hole may be drilled in the workpiece 18 underlying the drill plate 16. Since the drill plate 16 can be precisely aligned upon the workpiece 18, the resulting hole in the workpiece 18 is also precisely positioned.

As shown in cross-section in FIGS. 1–3, the clamping nose adapter 12 includes a lengthwise extending annular mandrel 20 defining a substantially cylindrical internal bore through which the cutting tool 22, such as a fluted drill bit, can extend. The clamping nose adapter 12 also includes a lengthwise extending annular collet 24 concentrically disposed about the mandrel 20 and having a first end including a plurality of longitudinally extending fingers 24a. According to the illustrated embodiment, each longitudinally extending finger 24a of the collet 24 has a first flanged end portion 24b. However, the longitudinally extending fingers 24a of the collet 24 need not include a first flanged end portion 24b, but can, instead, have other shapes without departing from the spirit and scope of the present invention as explained hereinafter.

The clamping nose adapter 12 also includes extension means for longitudinally extending the mandrel 20 and the collet 24 from a retracted position as illustrated in FIG. 3 to an extended position as illustrated in FIG. 2. The clamping nose adapter 12 further includes retraction means for longitudinally retracting the mandrel 20 within the collet 24 from the extended position to the retracted position.

The mandrel 20 has a shaft portion 20a having a first external diameter and an end portion 20b having an external diameter greater than the first external diameter. Preferably, the end portion 20b is conically tapered such that the external diameter of the end portion 20b gradually increases from the first external diameter to a larger diameter as shown in FIGS. 2 and 3.

The mandrel 20 can also include a generally cylindrical end portion 20c adjacent to and extending beyond the tapered end portion 20b. The generally cylindrical end portion 20c is designed to extend beyond the drill plate 16 when the mandrel 20 is in the retracted position as illustrated in FIG. 3. Accordingly, the generally cylindrical end portion 20c of the mandrel 20 provides further support to the cutting tool 22. The generally cylindrical end portion 20c of the mandrel 20 also includes wrenching flats 20d which facilitate assembly of the clamping nose adapter 12 as described hereinafter.

As illustrated in FIG. 2, the mandrel 20 extends beyond the collet 24 in the extended position such that the plurality of longitudinally extending fingers 24a of the collet 24 overlie the shaft portion 20a of the mandrel 20. The plurality of longitudinally extending fingers 24a therefore extend along the surface of the shaft portion 20a of the mandrel 20. Thus, the mandrel 20 and the collet 24 can be inserted through the aperture 14 defined in the drill plate IO since the aperture 14 has a slightly larger diameter than the unexpended first end of the collet 24, including the unexpended flanged end portions 24b as shown in FIG. 2.

During retraction, the mandrel 20 is retracted within the collet 24 such that the longitudinally extending fingers 24a of the collet 24 overlie the tapered end portion 20b of the mandrel 20 and are correspondingly radially expanded. In the illustrated embodiment, the radially expanded flanged end portions 24b of the plurality of longitudinally extending fingers 24a hook behind or onto a rear face 16a of drill plate 16 through which the mandrel 20 and collet 24 extend as shown in FIGS. 1, 3 and 4. The drill motor 10 is thus securely clamped to the drill plate 16.

In this embodiment, the diameter of the aperture 14 defined in the drill plate 16, while slightly larger than the unexpended collet 24, is preferably such that the expansion of the longitudinally extending fingers 24a of the collet 24 upon the tapered end portion 20b of the mandrel 20 expand the flanged end portions 24b of the collet 24 to a diameter greater than the diameter of the aperture 14 defined in the drill plate 16. The diameter of the aperture 14 can therefore vary as desired. The minimum value of the diameter of aperture 14 is slightly greater than the unexpended diameter of the flanged end portions 24b of the collet 24. In contrast, the maximum value of the diameter of aperture 14 is slightly less than the sum of the previously defined minimum value and twice the difference between the external diameter of the shaft portion 20a of the mandrel 20 and the largest diameter of the tapered end portion 20b of the mandrel Alternatively, in embodiments of the present invention in which the longitudinally extending fingers 24a of the collet 24 do not include flanged end portions 24b, the plurality of longitudinally extending fingers 24a are expanded within the aperture 14 to frictionally engage the drill plate 16 and to securely clamp the drill motor 10 thereto. In this embodiment, the diameter of the aperture 14 defined in the drill plate 16 must also be larger than the unexpended collet 24. However, the diameter of the aperture 14 must be small enough that the longitudinally extending fingers 24a of the collet 24 frictionally engage the interior walls of the aperture 14 when the longitudinally extending fingers 24a are expanded upon the tapered end portion 20b of the mandrel 20. The drill motor 10 is thus securely clamped to the drill plate 16.

The clamping nose adapter 12 also preferably includes a piston housing 26 defining a piston chamber 28 and a longitudinal bore through which the cutting tool 22 extends. The piston housing 26 is thus preferably disposed coaxially with the mandrel 20 and the collet 24. As shown in FIGS. 2 and 3, the piston housing 26 has first and second open ends 30 and 32, respectively. The first open end 30 has a front face 34 defining an aperture 36 therethrough. As previously described, the second open end 32 preferably includes threads for connection with the drill motor 10.

The clamping nose adapter 12 also includes a plurality of annular spacers 38 disposed within the piston housing 26 and defining a bore extending therethrough. The annular spacers 38 divide piston chamber 28 into a plurality of piston subchambers 40. The annular spacers 38 are fixed relative to the piston housing 26 such that the mandrel 20 and the collet 24 move relative to the annular spacers. For example, the annular spacers 38 can be held in a fixed relation to the piston housing 26 by a shoulder 42 defined by the interior wall of the piston housing 26 and a snap ring 44 removably retained within a groove 46 also defined in the interior wall of the piston housing which cooperate to secure the spacer therebetween. As illustrated, the outer and inner sidewalls of the annular spacers 38 preferably include a groove for receiving an O-ring 48. The O-rings 48 seal and separate the piston subchambers 40 and prevent leakage of fluid, such as air, therebetween. The O-rings 48 also facilitate relative movement between the mandrel 20 and the respective annular spacer 38.

As shown, each annular spacer 38 is disposed coaxially with the longitudinal bore of the piston housing 26, the mandrel 20 and the collet 24. In addition, while a single annular spacer 38 is illustrated, the clamping nose adapter 12 of the present invention can include a plurality of annular spacers to divide the piston chamber 28 into a plurality of piston subchambers 40. For example, a clamping nose adapter 12 which includes n annular spacers would be divided into (n+1) piston subchambers. In an embodiment of the present invention in which the clamping nose adapter 12 includes two or more annular spacers 38, the spacers are preferably spaced apart by substantially equal longitudinal lengths such that each piston subchamber 40 is of substantially equal size.

The clamping nose adapter 12 also includes a plurality of annular pistons 50 mounted to the mandrel 20 and adapted for movement therewith. As shown in FIGS. 2 and 3, the forwardmost annular piston is mounted to the mandrel 20 with a set screw 51 while the rearwardmost annular piston is threadably connected to the mandrel, however, the annular pistons can be connected to the mandrel in any manner known to those skilled in the art without departing from the spirit and scope of the present invention. In addition, the wrenching flats 20d of the mandrel facilitate its threaded connection to the rearwardmost annular piston.

Each of the plurality of annular pistons 50 is disposed in one of the piston subchambers 40 defined by the annular spacers 38. Preferably, one annular piston 50 is disposed in each piston subchamber 40. The annular pistons 50 therefore further define each piston subchamber 40 into a forward portion 40a and a rearward portion 40b. Although two annular pistons 50 are illustrated, the clamping nose adapter 12 may include any number of pistons without departing from the spirit and scope of the present invention.

Each annular piston 50 also preferably has a substantially equal stroke as defined by the size of the piston subchambers 40. Each annular piston 50 defines a bore having a longitudinal axis which preferably extends coaxially with the longitudinal axis of the piston housing 26, the spacers 38, the mandrel 20 and the collet 24.

The extension means of the clamping nose adapter 12 urges the plurality of annular pistons 50 forward within the piston housing 26 toward the first open end 30. Thus, the mandrel 20 and collet 24 are longitudinally moved from a retracted position to an extended position as described hereinafter. In the extended position, the mandrel 20 extends beyond the collet 24 and the plurality of longitudinally extending fingers 24a of the collet 24 overlie the shaft portion of the mandrel. Thus, the mandrel 20 and the collet 24 can be extended through the aperture 14 defined in the drill plate 16 since the diameter of the unexpended collet 24 is less than the diameter of the aperture 14 as described above.

Likewise, the retraction means of the clamping nose adapter 12 urges the plurality of annular pistons 50 rearward within the piston housing 26 toward the second open end 32. Thus, the mandrel 20 moves within the collet 24 from the extended position to the retracted position. In a retracted position, the longitudinally extending fingers 24a of the collet 24 overlie the tapered end portion 20b of the mandrel and are correspondingly extended radially. The radially expanded fingers 24b of the collet 24 engage the walls of the aperture 14 in the drill plate 16 and clamp the drill motor 10 to the drill plate.

The piston housing 26 also preferably defines a plurality of ports 52 extending therethrough into piston subchambers 40. In one embodiment, the plurality of ports 52 includes a pair of ports in communication with each piston subchamber 40. In this embodiment, one port 52a of the pair of ports is in communication with the forward portion 40a of the piston subchamber 40 and the other port 52b is in communication with the rearward portion 40b of the piston subchamber In one embodiment, the extension means includes means, such as a pump or other fluid pressure source, for introducing fluid, such as air, through at least one of the plurality of ports 52b defined in the piston housing 26 into a rearward portion 40b of at least one piston subchamber 40. By introducing fluid into the rearward portions 40b of the piston subchambers 40, each piston 50 is urged forward within its respective piston subchamber. Consequently, the mandrel 20 and the collet 24 are also urged forward to the extended position.

Since each annular piston 50 is mounted to the mandrel 20 of this embodiment of the clamping nose adapter 12, fluid need only be introduced into a rearward portion 40b of one piston subchamber 40 in order to urge each piston forward within its respective piston subchamber and to extend the mandrel 20 and the collet 24. However, fluid is preferably simultaneously introduced into the rearward portions 40b of a plurality of piston subchambers 40 without departing from the spirit and scope of the present invention.

The extension means also preferably includes means for evacuating fluid from a forward portion 40a of at least one piston subchamber 40 through at least one of the plurality of ports 52a of the piston housing 26. By evacuating fluid from a forward portion 40a of a piston subchamber 40, typically by bleeding fluid from the pressurized piston subchamber to atmosphere, each piston 50 is also urged forward within its respective piston subchamber 40.

In one embodiment, fluid is preferably evacuated simultaneously from the forward portion 40a of each of the plurality of piston subchambers 40 to extend the mandrel 20 and the collet 24. Alternatively, the fluid can be vacuumed from the forward portion 40a of a plurality of piston chambers 40 and, simultaneously, fluid may be introduced into the rearward portion 40b of the plurality of piston subchambers to extend the mandrel 20 and the collet 24.

Likewise, the retraction means typically includes means, such as a pump or other fluid pressure source, for introducing fluid, such as air, through at least one of the plurality of ports 52a of the piston housing 26 into a forward portion 40a of at least one piston subchamber 40. Preferably, fluid is introduced through each of the plurality of ports 52a which is in communication with a forward portion 52b of a piston subchamber 40. By introducing fluid into the forward portions 40a of the piston subchambers 40, each piston 50 is urged rearward within its respective piston subchamber. Consequently, the mandrel 20 and the collet 24 are also urged rearward to the retracted position.

Since each annular piston 50 is mounted to the mandrel 20, fluid need only be introduced into a forward portion 40a of one piston subchamber 40 in order to urge each piston rearward within its respective piston subchamber and to retract the mandrel 20 and the collet 24. However, fluid is preferably simultaneously introduced into the forward portions 40a of a plurality of piston subchambers 40 and, more preferably, into the forward portions 40a of each of the piston subchambers 40 in order to increase the clamping force of the clampup nose adapter 12.

The retraction means also preferably includes means for evacuating fluid from a rearward portion 40b of at least one piston subchamber 40 through at least one of the plurality of ports 52b of the piston housing 26. By evacuating fluid from a rearward portion 40b of a piston subchamber 40, each piston 50 is also urged rearward within its respective piston subchamber 40.

Preferably, fluid is simultaneously evacuated from the rearward portion 40b of each of a plurality of piston subchambers 40 to move the plurality of pistons 50 rearward. While the fluid is evacuated from the rearward portions 40b of a plurality of piston subchambers 40, fluid is preferably simultaneously introduced into the forward portions 40a of the plurality of piston subchambers to enhance the clampup force of the clamping nose adapter 12.

In order to further enhance the clampup force of the clamping nose adapter 12, one embodiment of the retraction means does not include means for evacuating the rearward portion 40b of the piston subchambers 40 but, instead, includes means, such as an external pump or other vacuum source, for vacuuming fluid from the rearward portion of the piston subchambers. Thus, the clamping force of the clamping nose adapter 12 is enhanced by the introduction of fluid into the forward portion 40a of piston subchambers 40 while simultaneously vacuuming fluid from the rearward portion 40b of piston subchambers.

As illustrated in FIGS. 2 and 3, each port 52a in communication with a forward portion 40a of a piston subchamber 40 is interconnected by a first fluid passageway 54 defined in the sidewall of the piston housing 26. Further, although only one port 52b is illustrated in communication with a rearward portion 40b of a piston subchamber 40, an alternative embodiment of the piston housing 26 defines a plurality of ports 52b, one of which is in communication with the rearward portion of each piston subchamber. Thus, in this embodiment, each port 52b is also preferably connected to a second fluid passageway defined in the sidewall of the piston housing 26. By interconnecting the ports to a respective fluid passageway, a substantially equal volume of fluid under a substantially equal pressure is simultaneously introduced to or evacuated from each port connected to a fluid passageway. For embodiments which include both first and second fluid passageways, the fluid passageways are distinct such that fluid can be separately evacuated or introduced through each of the fluid passageways.

As illustrated in FIGS. 2 and 3, the first fluid passageway 54, port 52b and air fittings 55 are preferably in communication with a valve, such as a four-way pneumatic valve, which interconnects the respective fluid passageways or ports with the means for evacuating or introducing fluid therethrough. The valve also controls the introduction of fluid to the passageways and evacuation of fluid from the passageways as known to those skilled in the art.

As shown in FIGS. 1–3, the second end of the collet 24 extends through the aperture 36 defined in the front face 34 of the piston housing 26 and has a outwardly extending flange 24c such that the second end of the collet 24 is retained within the piston housing 26. The collet 24 can, however, move axially within the piston housing 26. A collet piston 25 is preferably disposed in the piston housing 26 adjacent, and preferably abutting, the rear flanged portion 24c of the collet 24. A collet-piston spring 56 is also preferably disposed within the piston housing 26. The collet-piston spring 56 has a first end adjacent an annular piston 50 and a second end adjacent the collet piston 25. As illustrated, the first end of the collet-piston spring 56 is preferably adjacent the annular piston 50 positioned forwardmost within the piston housing 26. Accordingly, the collet piston spring 56 urges the collet piston 25 and the collet 24 forward within the piston housing 26.

The coordinated movement of the pistons 50, the mandrel 20 and the collet 24 is due, in part, to the connection of the mandrel 20 to the pistons 50 such that the movement of the mandrel 20 tracks the movement of the pistons 50. The forward movement of the piston 50 is also transferred to the collet piston 25 and the collet 24 through the collet-piston spring 56. The forward movement of the collet 24 is restricted such that the collet does not advance as far as the mandrel 20. The collet 24 is restricted by its contact with the rear inner surface of the front face 34 of the piston housing 26 which prevents further extension of the collet 24 as illustrated in FIG. 2. In particular, the outwardly extending flange 24c of the second end of the collet 24 engages the rear inner surface of the front face 34 of the piston housing 26. Thus, when the pistons 50 are fully extended, the collet-piston spring 56 is compressed due to the axial restriction imposed by the piston housing 26.

The collet 24 is retracted upon rearward movement of the pistons 50 due to the cooperation of a shoulder 20d formed on the outer surface of the mandrel 20 which engages an inwardly extending flange 24d on the second end of the collet 24. Accordingly, the retraction of the mandrel 20 also retracts the collet 24.

In one embodiment, the retraction means also preferably includes means for providing a resistant force to the collet 24 during expansion of the longitudinally extending fingers 24a. In particular, the introduction of fluid through the forwardmost port 52a into piston subchamber 40 urges the collet piston 25 and the collet 24 longitudinally forward such that the collet piston 25 and the collet 24 are held in a fixed position until the longitudinally extending fingers 24a are fully expanded. Once fully expanded, the mandrel shoulder 20d contacts the collet flange 24d and, upon further retraction, the collet 24 moves longitudinally rearward until the collet 24 is clamped to the drill plate 16. In this embodiment, the collet piston 25 and the collet piston spring 56 provide a resistant force to maintain expansion of the collet fingers 24a. The collet piston spring 56 also maintains the collet 24 forward when the nose adapter 12 is in the extended position for insertion in aperture 14 of the drill plate 16.

One embodiment of a clamping nose adapter 12 according to the present invention which incorporates vacuum capabilities is illustrated in FIGS. 2 and 3. In this embodiment, the clamping nose adapter 12 includes a vacuum module 60 which can either be incorporated within the piston housing 26 or incorporated within the drill motor housing 10a so as to interface with the piston housing attached thereto. As shown, the vacuum module 60 includes an annular vacuum housing 62 which defines a vacuum chamber 64 and to which an annular drill guide 58 is connected. The drill guide 58 is connected to the vacuum housing 62, such as by one or more set screws 63, and is concentrically disposed within the mandrel 20 and the collet 24 for further supporting the cutting tool 22. In addition, the drill guide 58 has a substantially cylindrical shaft portion 58a and an end portion 58b which contains a vacuum suction-port 58f.

The vacuum module 60 and the drill guide 58 are preferably spring loaded such that the axial force of spring 66 urges the drill guide 58 forward for intimate contact with workpiece 16. As shown, the drill guide spring 66 can be positioned rearwardly of the annular vacuum housing 62 to contact at a first end, a rear surface of the annular vacuum housing 62 and, at a second end, a washer 65 which is adjacent to snap ring 69 extending inwardly from either the piston housing 26 or the drill motor housing 10a. In the illustrated embodiment, the forward extension of the annular body 62 and the drill guide 58 provided by the drill guide spring 66 is limited, however, by abutment of vacuum tube 61 against the inside surface of a slotted opening 10b in the drill motor housing 10a.

As further illustrated in FIGS. 2 and 3, the annular body 62 of this embodiment also preferably defines a vacuum port 68 in fluid communication with the vacuum chamber 64. The cutting tool 22 extends through the bore of the annular vacuum housing 62 such that the flutes of a fluted cutting tool are in communication with the vacuum chamber 64 and, in turn, with the vacuum port 68.

The clamping nose adapter 12 and the associated drill motor housing 10a preferably include means for vacuuming chip swarf and expended lubricant-coolant from the surface of the workpiece 18 through the central longitudinal bore of the drill guide 58 and the vacuum housing 62. The vacuuming means typically includes a vacuum tube 61 connected at the first end to vacuum port 68 and at a second end to a vacuum hose (not illustrated) which, in turn, is connected to an external pump or vacuum source (not illustrated). Accordingly, the external pump or vacuum source can draw air through vacuum suction port 58f in the drill guide 58 which carries chip swarf and expended lubricant-coolant through the flutes of the cutting tool 22 and the internal bore of the drill guide 58, through the vacuum housing 62, through the vacuum port 68, through the vacuum tube 61, through the vacuum hose, to the external pump or vacuum source for collection.

In order to further establish a vacuum, the drill guide 58 and the surface of the workpiece 18 are preferably in contact as to allow vacuum air to be drawn through the vacuum suction port 58*f* the central longitudinal bore of the drill guide 58. As illustrated in FIGS. 2 and 3, the drill guide spring 66 extends the drill guide 58 for contact with the workpiece 18 upon insertion of the mandrel 20 and the collet 24 through the aperture 14 in the drill plate 16. The drill guide spring 66 is thereafter compressed as the mandrel 20 and the collet 24 are further inserted through the aperture 14. However, contact is preferably maintained between the drill guide 58 and the surface of the workpiece 18 during retraction of the mandrel 20 and the collet 24.

As shown in FIG. 3, the external pump or vacuum source can also be adapted to draw fluid from the rearward portions 40*b* of the piston subchambers 40. In particular, the fluid is drawn through fluid port 72, through the longitudinal groove in the drill guide 58, through fluid port 74 in the drill guide 58, through the longitudinal bore of the drill guide 58 and the flutes of the cutting tool 22, through the vacuum housing 62, through the vacuum port 68 and through the vacuum tube 61 to the external pump or vacuum source (not illustrated).

In the embodiment illustrated in FIGS. 2, 3 and 5, the mandrel 20 further defines a coolant supply port 70 in fluid communication with the forwardmost piston subchamber 40*a*. The drill guide 58 of this embodiment also includes a channel 58*c* defined longitudinally along its exterior surface and at least one forward aperture 58*d* and at least one rear aperture 58*e* defined through the end portion 58*b* of drill guide 58. The channel 58*c* defined by the drill guide 58 is in fluid communication at a first end with coolant supply port 70 defined in the mandrel 20 and at a second end with the apertures 58*d* and 58*e* defined in the end portion 58*b* of drill guide 58. Thus, lubricant-coolant introduced through the forwardmost port 52*a* defined in the piston housing 26 into the forwardmost piston subchamber 40*a* flows through coolant supply port 70, the longitudinal channel 58*c* in the drill guide 58 and through both apertures 58*d* and 58*e*. The fluid introduced through aperture 58*d* is directed forwardly to lubricate and cool the cutting tool while fluid introduced through aperture 58*e* provides a jet of high velocity fluid, such as air, rearward through the flutes of the cutting tool to complement lower velocity vacuum air flow and thereby facilitate the removal of chip swarf and expended coolant through the drill guide 58 and the vacuum module 60.

A relatively small amount of lubricant-coolant introduced into the forwardmost piston chamber 40*a* can also be allowed by the clamping nose adapter 12 to leak between the collet piston 25 and the mandrel 20 to lubricate the mandrel and the collet 24. The amount of coolant leaking between the collet piston 25 and the mandrel 20 is relatively small such that the clamping power of the clamping nose adapter 12 is not appreciably diminished.

One embodiment of the mandrel 20 also includes a relatively small fluid injection port 72 in communication with the piston subchamber 40*b*. The fluid injection port 72 is preferably aligned with a corresponding drill guide fluid port 74 defined in the drill guide 58 such that a relatively small amount of the fluid introduced into the piston subchamber 40*b* flows through the fluid injection port 72 and the drill guide fluid port 74 to the bore defined by the mandrel 20 through which the cutting tool 22 extends. Thus, the cutting tool 22 can be cleaned and cooled, after each drill cycle, by fluid injected therein and flowing through the flutes of a fluted cutting tool. As illustrated in FIGS. 2 and 3, the drill guide fluid port 74 includes an elongated groove along the exterior surface of the drill guide 58 such that the fluid injection port 72 and the drill guide fluid port remain aligned and in communication as the drill guide moves longitudinally relative to the mandrel 20.

The clamping nose adapter 12 of the present invention need not include vacuum capabilities as illustrated by the embodiments of FIGS. 6–8. For example, the embodiment of the clamping nose adapter of FIG. 6 includes an optional drill guide 158 connected to mandrel 20 and an annular piston 50 by a set screw 151. In the embodiment of the clamping nose adapter of FIG. 7, optional drill guides 258 are pressed-fit into the internal bore of the mandrel 20. Both embodiments, namely, the embodiments of FIGS. 6 and 7, will preferably accommodate standard commercial cutting tools 122 for drilling holes in the workpiece 18. Further, the embodiment of the clamping nose adapter of FIG. 8 does not include a drill guide in order to accommodate standard commercial drill-countersinking, counterboring and spotfacing cutting tools 222 for drilling, countersinking, counterboring and spotfacing holes in a workpiece 18, respectively. In each of the embodiments illustrated in FIGS. 6–8, the chip swarf and expended lubricant-coolant are expelled in the open space between the drill plate 16 and the workpiece 18 during either drilling, drill-countersinking, counterboring or spotfacing operations.

The embodiments of the clamping nose adapter 12 of the present invention which are illustrated in FIGS. 6–8 also include means for lubricating or cooling the cutting tool, the workpiece and components of the nose adapter during each drill cycle. In the embodiment of FIG. 6, the lubricant-coolant is delivered in the manner described above in conjunction with clamping nose adapters which include vacuum capabilities as illustrated in FIGS. 2 and 3. In the embodiments of the clamping nose adapter illustrated in FIGS. 7 and 8, the lubricant-coolant is directed through port 70 of the mandrel 20 to lubricate or cool the cutting tool 122 and 222 and the workpiece 18. In the embodiment of the clamping nose adapter illustrated in FIGS. 6–8, the collet and mandrel are also lubricated and cooled in the same manner as described above in conjunction with the embodiment of the clamping nose adapter which supports vacuum capabilities as shown in FIGS. 2 and 3.

Each embodiment of the clamping nose adapter 12 illustrated in FIGS. 6–8 also includes means for cleaning and cooling the cutting tools after each drill cycle in the same manner as described previously in conjunction with embodiments of the nose adapter which include vacuum configuration as illustrated in FIGS. 2 and 3. In the embodiments of the clamping nose adapter shown in FIGS. 6–8, however, a jet of high velocity fluid, such as air, is directed through port 72 to clean and wash chip swarf from the flutes of the cutting tool for expulsion in the open space between the drill plate 16 and the workpiece 18.

Thus, the clamping nose adapter 12 of the present invention can accommodate standard low cost commercial cutting tools as well as satisfy variable drilling, drill-countersinking, counterboring, and spotfacing applications with a minimum of interchangeable component parts. In addition, such part interchangeability does not sacrifice the lubricant, coolant, self cleaning and cutter cooling capabilities of the invention.

In the drawings and specification, there have been disclosed typical preferred embodiments of the invention and, although specific terms are employed, the terms are used in a generic and descriptive sense only not for purposes of limitation, the scope of the invention being set forth in the following claims.

That which is claimed is:

1. A device for clamping a drill motor to a drill plate and for receiving a cutting tool, said clamping device comprising:

a piston housing having first and second opposed open ends and defining a piston chamber therein;

an annular mandrel disposed within said piston housing and extending through said first open end thereof, said mandrel defining a cylindrical internal bore through which the cutting tool may extend, said mandrel having a shaft portion having a first external diameter and a tapered end portion having a second external diameter greater than the first external diameter;

an annular collet concentrically disposed about said mandrel and having a first end including a plurality of longitudinally extending fingers;

at least one annular spacer disposed within said piston housing to divide the piston chamber into a plurality of piston subchambers;

a plurality of annular pistons mounted to said mandrel and adapted for movement therewith wherein each of said plurality of annular pistons is disposed in one of said piston subchambers defined by said at least one of annular spacer to define the piston subchamber into a forward portion and a rearward portion, and wherein each annular piston defines a bore having a longitudinal axis extending coaxial with the longitudinal axes of said mandrel and said collet;

extension means for urging said plurality of annular pistons forward within said piston housing toward the first open end such that said mandrel and collet are longitudinally moved from a retracted position to an extended position wherein said mandrel extends beyond said collet and the plurality of longitudinally extending fingers of said collet overlie the shaft portion of said mandrel in the extended position such that the mandrel and collet may be extended through an aperture defined in the drill plate; and retraction means for urging said plurality of annular pistons rearward within said piston housing toward the second open end such that said mandrel is moved within said collet from the extended position to the retracted position wherein the longitudinally extending fingers of said collet overlie the tapered end portion of said mandrel and correspondingly expand radially in the retracted position to engage the drill plate and to clamp the drill motor to the drill plate.

2. A clamping device according to claim 1 wherein said piston housing defines a plurality of ports extending therethrough into a piston subchamber, and wherein said extension means for urging said plurality of annular pistons forward within said piston housing includes means for introducing fluid through at least one of said plurality of ports of said piston housing into a rearward portion of at least one piston subchamber such that each piston is urged forward within a piston subchamber.

3. A clamping device according to claim 2 wherein said extension means includes means for evacuating fluid from a forward portion of at least one piston subchamber through at least one of said plurality of ports of said piston housing such that each piston is urged forward within a piston subchamber.

4. A clamping device according to claim 1 wherein said piston housing defines a plurality of ports extending therethrough into a piston subchamber, and wherein said retraction means for urging said plurality of annular pistons rearward within said piston housing includes means for evacuating fluid from a rearward portion of at least one piston subchamber through at least one of said plurality of ports of said piston housing such that each piston is urged rearward within a piston subchamber.

5. A clamping device according to claim 4 wherein said retraction means includes means for introducing fluid through at least one of said plurality of ports of said piston housing into a forward portion of at least one piston subchamber such that each piston is urged rearward within a piston subchamber.

6. A clamping device according to claim 4 further comprising a collet piston disposed in said piston housing adjacent said annular collet, and wherein said retraction means includes means for introducing fluid into the forwardmost piston subchamber of said piston housing such that the collet piston is urged forward to thereby provide a resistant force for collet expansion and relative movement between said mandrel and said collet.

7. A clamping device according to claim 6 further comprising a collet-piston spring disposed within said piston housing and having a first end adjacent an annular piston and a second end adjacent said collet piston such that said collet piston and said collet are thereby urged longitudinally forward.

8. A clamping device according to claim 1 further comprising an annular drill guide concentrically disposed within said mandrel and collet for supporting the cutting element.

9. A clamping device according to claim 1 wherein said mandrel further defines a lubricant-coolant supply port, and wherein said clamping device further comprises means for introducing lubricant-coolant through said coolant supply port for delivery to the cutting tool and the workpiece.

10. A clamping device according to claim 9 further comprising an annular drill guide concentrically disposed within said mandrel and collet for supporting the cutting tool wherein said drill guide defines a longitudinal channel along an exterior surface thereof and at least one aperture extending through said drill guide from said longitudinal channel such that coolant introduced through said lubricant-coolant supply port flows through said longitudinal channel and said at least one aperture for delivery to the cutting tool and the workpiece.

11. A clamping device according to claim 1 wherein said mandrel further comprises a cylindrical end portion adjacent to and extending beyond the tapered end portion such that the cylindrical end portion protrudes beyond the drill plate when said mandrel is in the retracted position to further support the cutting tool.

12. A clamping device according to claim 1 wherein said piston housing further defines a vacuum port therethrough, and wherein said clamping device further comprises means for vacuuming expended coolant and chip swarf from the cylindrical internal bore of said mandrel.

13. A clamping device according to claim 1 wherein said piston housing further includes means for vacuuming air from the piston subchambers to enhance the clamping force of the clamping device.

14. A combination of a drill motor and a device for clamping the drill motor to a drill plate and for receiving a cutting tool, the clamping device comprising:

a piston housing having first and second opposed open ends and defining a piston chamber therein;

an annular mandrel disposed within said piston housing and extending through said first open end thereof, said mandrel defining a cylindrical internal bore through which the cutting tool may extend, said mandrel having a shaft portion having a first external diameter and a tapered end portion having a second external diameter greater than the first external diameter;

an annular collet concentrically disposed about said mandrel and having a first end including a plurality of longitudinally extending fingers;

at least one annular spacer disposed within said piston housing to divide the piston chamber into a plurality of piston subchambers;

a plurality of annular pistons mounted to said mandrel and adapted for movement therewith wherein each of said plurality of annular pistons is disposed in one of said piston subchambers defined by said at least one annular spacer to define each piston subchamber into a forward portion and a rearward portion, and wherein each annular piston defines a bore having a longitudinal axis extending coaxial with the longitudinal axes of said mandrel and said collet;

extension means for urging said plurality of annular pistons forward within said piston housing toward the first open end such that said mandrel and collet are longitudinally moved from a retracted position to an extended position wherein said mandrel extends beyond said collet and the plurality of longitudinally extending fingers of said collet overlie the central shaft portion of said mandrel in the extended position such that the mandrel and collet may be extended through an aperture defined in the drill plate; and retraction means for urging said plurality of annular pistons rearward within said piston housing toward the second open end such that said mandrel is moved within said collet from the extended position to the retracted position wherein the longitudinally extending fingers of said collet overlie the tapered end portion of said mandrel and correspondingly expand radially in the retracted position to engage the drill plate and to clamp the drill motor to the drill plate.

15. A combination of a drill motor and a clamping device according to claim 14 wherein said piston housing of the clamping device defines a plurality of ports extending therethrough into a piston subchamber, and wherein said extension means for urging said plurality of annular pistons forward within said piston housing includes means for introducing fluid through at least one of said plurality of ports of said piston housing into a rearward portion of at least one piston subchamber such that each piston is urged forward within a piston subchamber.

16. A combination of a drill motor and a clamping device according to claim 15 wherein said extension means of the clamping device includes means for evacuating fluid from a forward portion of at least one piston subchamber through at least one of said plurality of ports of said piston housing such that each piston is urged forward within a piston subchamber.

17. A combination of a drill motor and a clamping device according to claim 14 wherein said piston housing of the clamping device defines a plurality of ports extending therethrough into a piston subchamber, and wherein said retraction means for urging said plurality of annular pistons rearward within said piston housing includes means for evacuating fluid from a rearward portion of at least one piston subchamber through at least one of said plurality of ports of said piston housing such that each piston is urged rearward within a piston subchamber.

18. A combination of a drill motor and a clamping device according to claim 17 wherein said retraction means of the clamping device includes means for means for introducing fluid through at least one of said plurality of ports of said piston housing into a forward portion of at least one piston subchamber such that each piston is urged rearward within a piston subchamber.

19. A combination of a drill motor and a clamping device according to claim 17 further comprising a collet piston disposed in said piston housing adjacent said annular collet, and wherein said retraction means includes means for introducing fluid into the forwardmost piston subchamber of said piston housing such that the collet piston is urged forward to thereby provide for relative movement between said mandrel and said collet.

20. A combination of a drill motor and a clamping device according to claim 19 further comprising a collet-piston spring disposed within said piston housing and having a first end adjacent an annular piston and a second end adjacent said collet piston such that said collet piston and said collet are thereby urged longitudinally forward.

21. A method of clamping a drill motor to a drill plate with a clamping device having a piston housing defining a piston chamber having first and second ends, at least one annular spacer disposed within the piston housing to divide the piston chamber into a plurality of piston subchambers, a plurality of annular pistons disposed in the piston housing such that each annular piston is disposed in and divide a piston subchamber into forward and rearward portions, a lengthwise extending annular mandrel disposed within the piston housing and having a shaft portion having a first external diameter and a tapered end portion having a second external diameter greater than the first external diameter, and a lengthwise extending collet concentrically disposed about the mandrel and having a plurality of longitudinally extending fingers, wherein the mandrel and the collet are adapted for longitudinal movement in response to longitudinal movement of the plurality of annular pistons, and wherein the spacer, pistons, mandrel and collet are disposed coaxially and define a substantially cylindrical longitudinal bore for receiving a cutting tool, the method comprising the steps of:

urging the plurality of annular pistons of the clamping device forward within the piston housing toward the first end such that the mandrel and collet are longitudinally moved from a retracted position to an extended position wherein the mandrel extends beyond said collet and the plurality of longitudinally extending fingers of the collet overlie the shaft portion of said mandrel such that the mandrel and collet may be extended through an aperture in the drill plate; and urging the plurality of annular pistons of the clamping device rearward within the piston housing toward the second end such that the mandrel is moved within the collet from the extended position to the retracted position wherein the longitudinally extending fingers of the collet overlie the tapered end portion of said mandrel and correspondingly expand radially to engage the drill plate and to clamp the drill motor to the drill plate.

22. A method of clamping a drill motor to a drill plate according to claim 21 wherein the piston housing of the clamping device defines a plurality of ports extending therethrough into a piston subchamber, and wherein said step of urging the plurality of annular pistons forward within the piston housing includes the step of introducing fluid through at least one of the plurality of ports into a rearward portion of at least one piston subchamber such that each piston is urged forward within a piston subchamber.

23. A method of clamping a drill motor to a drill plate according to claim 22 wherein said step of urging the plurality of annular pistons forward within the piston housing further includes the step of evacuating fluid from a forward portion of at least one piston subchamber through at least one of the plurality of ports such that each piston is urged forward within a piston subchamber.

24. A method of clamping a drill motor to a drill plate according to claim 21 wherein the piston housing of the clamping device defines a plurality of ports extending therethrough into a piston subchamber, and wherein said step of urging the plurality of annular pistons rearward within the piston housing includes the step of introducing fluid through at least one of the plurality of ports into a forward portion of at least one piston subchamber such that each piston is urged rearward within a piston subchamber.

25. A method of clamping a drill motor to a drill plate according to claim 24 wherein said step of urging the plurality of annular pistons rearward within the piston housing further includes the step of evacuating fluid from a rearward portion of at least one piston subchamber through at least one of the plurality of ports such that each piston is urged rearward within a piston subchamber.

26. A method for clamping a drill motor to a drill plate according to claim 21 further comprising the step of guiding and supporting the cutting tool with a drill guide concentrically disposed within the mandrel and the collet.

27. A method for clamping a drill motor to a drill plate according to claim 21 wherein the mandrel of the clamping device further defines a lubricant-coolant supply port, the method further comprising the step of introducing lubricant-coolant through the lubricant-coolant supply port into the longitudinal bore defined therein for delivery to the cutting tool and to the workpiece such that the cutting tool is lubricated and the cutting tool and the workpiece is cooled.

28. A method for clamping a drill motor to a drill plate according to claim 21 wherein the piston housing of the clamping device further defines a vacuum port therethrough, the method further comprising the step of vacuuming expended coolant and chip swarf from both the longitudinal bore defined by the mandrel and from the workpiece.

29. A method for clamping a drill motor to a drill plate according to claim 21 further comprising the steps of advancing the cutting tool and drilling a hole in a workpiece following said step of simultaneously retracting the mandrel and the collet.

\* \* \* \* \*